United States Patent [19]
Curtis

[11] 3,925,876
[45] Dec. 16, 1975

[54] METHOD OF JOINING BOLTS OR RIVETS TO NUTS

[75] Inventor: Donald A. Curtis, Ashville, N.Y.

[73] Assignee: TRW Inc., Cleveland, Ohio

[22] Filed: Mar. 26, 1974

[21] Appl. No.: 454,856

[52] U.S. Cl. .................... 29/509; 29/522; 29/526; 151/31; 219/151; 219/152
[51] Int. Cl.[2] .................... B21D 39/00; B23P 11/00
[58] Field of Search ............ 29/509, 522, 523, 512, 29/526; 151/31; 219/150 R, 150 V, 151 X, 152 X

[56] References Cited
UNITED STATES PATENTS

| | | | |
|---|---|---|---|
| 114,474 | 5/1871 | Randolph | 151/31 UX |
| 1,587,445 | 6/1926 | Thomson | 219/150 V |
| 1,780,675 | 11/1930 | Hewitt | 151/31 |
| 2,465,144 | 3/1949 | Wyatt | 219/150 V X |
| 3,039,798 | 6/1962 | Carlson et al. | 219/150 V X |

FOREIGN PATENTS OR APPLICATIONS

| 12,823 | 1884 | United Kingdom | 151/31 |
|---|---|---|---|

*Primary Examiner*—Charlie T. Moon
*Attorney, Agent, or Firm*—Hill, Gross, Simpson, Van Santen, Steadman, Chiara & Simpson

[57] ABSTRACT

An improved fastening device and a method of fastening a plurality of members together. The fastening device includes a headed pin which has a threaded shank portion, the latter having a polygonal recess formed at the outer end thereof. The pin is seated with its head against one surface of the members to be fastened together and at least a part of the threaded shank portion extends beyond the opposite surface of the members to be fastened together. A nut is then threaded onto the threaded shank portion with sufficient torque to develop a preloading stress in the pin. Finally, a heating element is inserted into the polygonal recess to thereby cause plastic deformation of the threaded shank portion to lock the shank portion to the nut and also to provide an increased tension in the pin.

3 Claims, 5 Drawing Figures

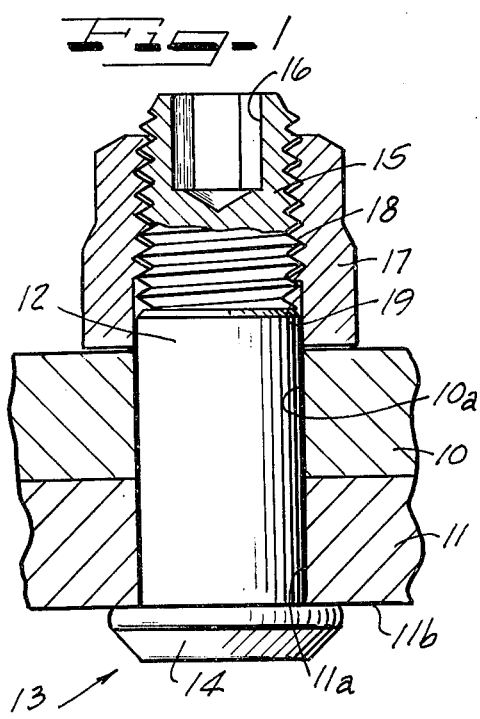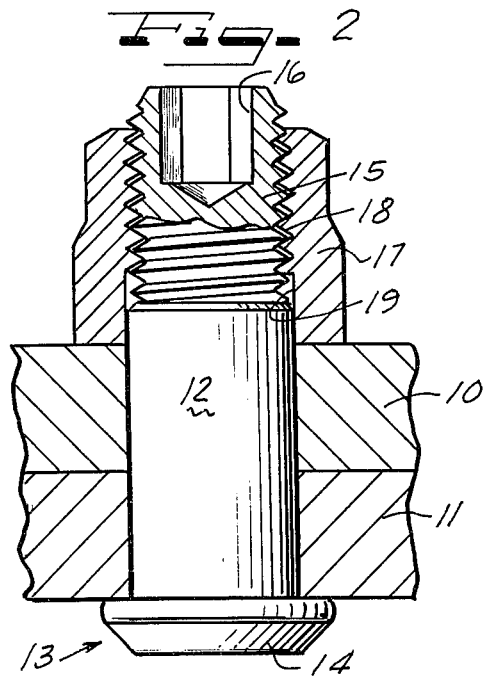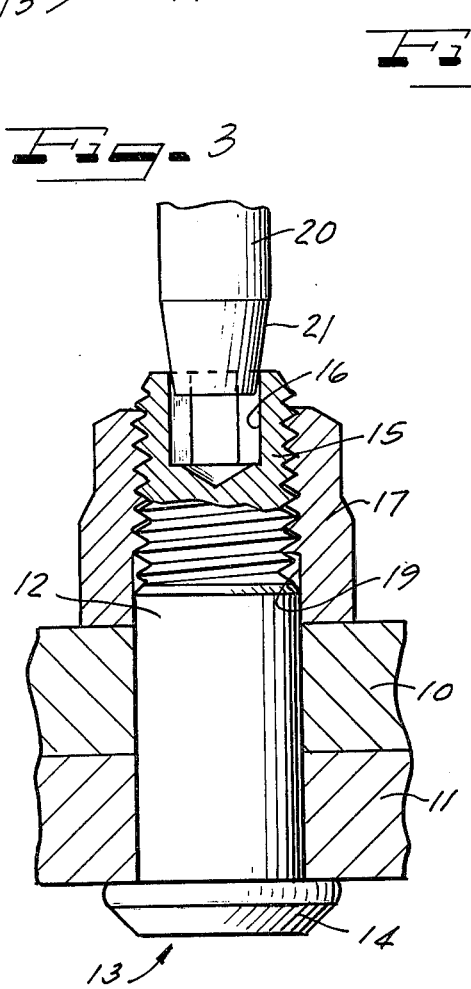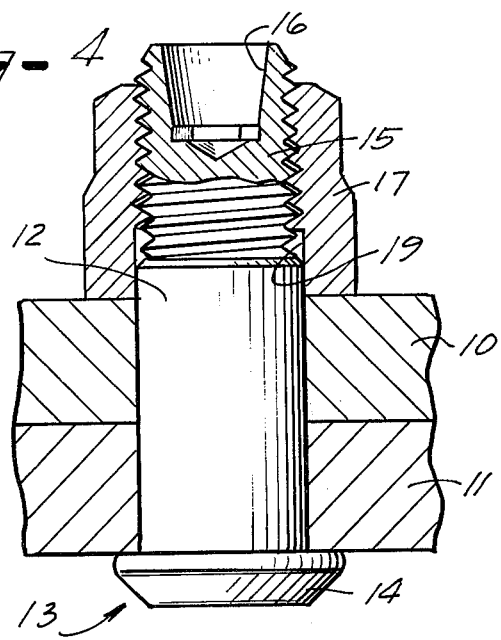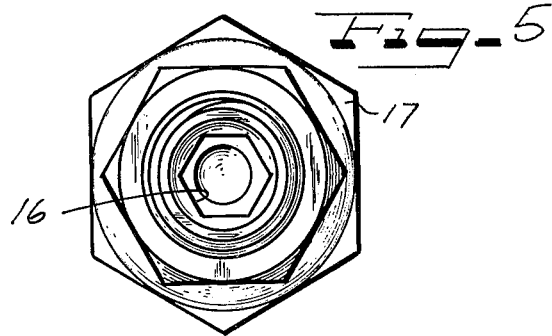

METHOD OF JOINING BOLTS OR RIVETS TO NUTS

BACKGROUND OF THE INVENTION

1. Field of the Invention

This invention is in the field of fasteners in which a high residual tension is provided in a fastening pin by first applying a preloading tension to the pin and then plastically deforming the end of the pin so that it is locked to the nut and has its clamping force further increased.

2. Description of the Prior Art

Stressed structures in fastening means are, of course, as old as the ordinary nut and bolt. A significant improvement in the art of stressed structures is provided by the types of fasteners described in the Orloff et al. U.S. Pat. No. 3,421,562 which issued on Jan. 14, 1969. This patent describes a pin and collar structure in which the pin has an integral head at one end and peripheral grooves at the stem end. The outermost portion of the grooves are in the form of screw threads, and the adjacent peripheral grooves are in a form to provide antirotation locking grooves. A collar or nut is applied to the projecting end of the pin, the collar or nut having internal threads formed over a portion of its length with the remaining portion being circular in cross-section and having smooth inner and outer surfaces of substantially uniform wall thicknesses. The collar is applied by torquing it onto the threaded end of the stem with the smooth collar portion overlying the locking grooves on the stem. After the collar is torqued on with relatively low torque, the remaining circular and smooth portion is then crimped inwardly into the locking grooves by means of a special crimping tool. The crimping action effects an elongation of the collar which, having been fixed relative to the pin by the threaded coaction, causes the pin to stretch and places the pin under a high tension.

The types of fasteners described in the aforementioned Orloff et al. patent have been widely used commercially with significant success. However, there is an inherent space limitation in the use of these fasteners. The crimping tool requires a substantial free space to be provided about the periphery of the collar or nut in order that the crimping tool may properly engage the proper portion of the nut to perform the crimping operation. The requisite amount of space is not always available and therefore other means must be provided for securing the proper tension on the pin when the pin and nut are located in relatively inaccessible areas. Satisfaction of that need is the principal object of the present invention.

SUMMARY OF THE INVENTION

The present invention provides an improved joint structure and a method for producing that structure. The method involves fastening together a plurality of members having aligned coaxial apertures by means of a headed pin having a threaded shank portion with a polygonal recess formed therein. The head of the pin is seated against one surface of the members to be fastened together and the pin is of sufficient length so that its shank portion extends beyond the opposite surface of the members to be fastened together. A nut is threaded onto the threaded shank portion with sufficient torque to develop a preloading stress in the pin. Thereafter, a heating element such as an electrode is partially inserted into the polygonal recess to cause plastic deformation of the threaded shank portion resulting in the pin becoming locked to the nut and also resulting in an increase in the clamping force.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a view partly in elevation and partly in cross-section illustrating the fastener means of the present invention with the nut assembled onto the pin, but still in free turning relationship;

FIG. 2 is a view similar to FIG. 1 but showing the condition in which the nut is tightened to develop an initial preload;

FIG. 3 is a view similar to FIGS. 1 and 2 but showing the heating means being introduced into the pin end;

FIG. 4 is a view of the structure after the pin end has been flared to lock the nut to the pin and to increase the clamping force; and FIG. 5 is a plan view of the structure shown in FIG. 4.

DESCRIPTION OF THE PREFERRED EMBODIMENTS

In FIG. 1, there is illustrated a pair of flat plates 10 and 11 which should be joined together by the fastening means of the present invention. The plates 10 and 11 have axially registering apertures 10a and 11a, respectively, which receive an unthreaded shank portion 12 of a pin generally indicated at reference numeral 13. The pin also includes a headed portion 14 which is seated against the rear surface 11b of the plate 11.

The pin 13 has a threaded shank portion 15 which extends beyond the plate 10 as illustrated. In the extreme end of the threaded shank portion 15 there is formed a polygonal blind-ended recess 16 which in the form of the invention illustrated takes the form of a hexagonal recess.

A nut 17 is provided with internal threads 18 which are arranged to be received in threaded engagement with the threads in the shank portion 15. The nut 17 also may include a relieved, unthreaded portion 19.

With the nut assembled as shown in FIG. 1, the nut 17 is still in free-turning relationship with respect to the pin 13. The first step in the assembly of the fastener of the present invention consists in tightening the nut 17 to develop an initial preload. Typically, this torquing will be carried out to a value of about 20 to 40 inch pounds to provide an initial stress in the pin 13.

After the initial preloading, a heating element such as an electrode 20 (FIG. 3) is inserted into the recessed portion 16 of the pin and sufficient heat is applied to plastically deform the end of the pin 13 so that it assumes a generally frusto-pyrimidical shape in cross-section, as shown best in FIG. 4 of the drawings. As a result of this deformation, metal is moved from the shank portion 15 into the threads of the nut 17. The electrode 20 may consist of a tungsten tip embedded in a copper rod and having a tapered end face 21, of a diameter sufficiently small to enter at least partially into the hexagonal recess 16.

The flaring of the end of the threaded shank portion 15 serves to lock the pin 13 to the nut 17 as well as to increase the clamping force present at the plates 10 and 11.

The preferred means for heating the end of the pin is by means of an electrode of the type described which causes the passage of electric current through the pin resulting in the required deformation. Other heating means can, however, be used. By varying the design of the electrode, particularly the shape, the length of the threaded portion which is deformed and also the amount of increase in pin diameter can be controlled.

The method of securing the fastener elements according to the present invention has the distinct advantage that it can be accomplished in a limited amount of space. The method of the present invention eliminates the necessity of using a crimping tool while still providing the required additional tension on the pin.

It should be evident that various modifications can be made to the described embodiments without departing from the scope of the present invention.

I claim as my invention:

1. The method of fastening together a plurality of members having aligned coaxial apertures which comprises providing a headed pin having a threaded shank portion with a polygonal recess formed therein, seating the head of the pin against one surface of the members to be fastened together, the pin being of sufficient length so that the threaded shank portion extends through said apertures and beyond the opposite surface of the members to be fastened together, threading a nut onto said threaded shank portion with sufficient torque to develop a preloading stress in said pin, and thereafter inserting a heating element into said polygonal recess to thereby cause radially outward plastic deformation of the threaded shank portion from which results increased tension in said pin.

2. The method of claim 1 in which said heating element is an electrode.

3. The method of claim 1 in which said heating element has a generally frusto-conical configuration.

* * * * *